Dec. 4, 1962 G. MÖHRING 3,066,378
MOUNTING MEANS FOR PIN RACKS OF CLOTH STRETCHING
AND DRYING MACHINES
Filed April 21, 1959 3 Sheets-Sheet 1
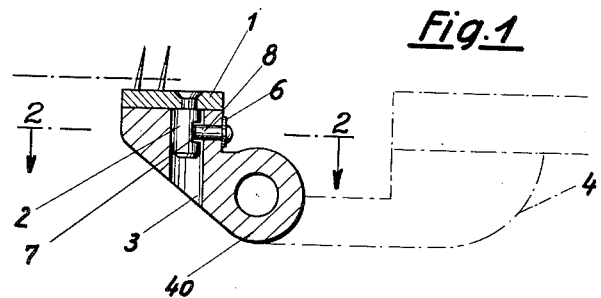
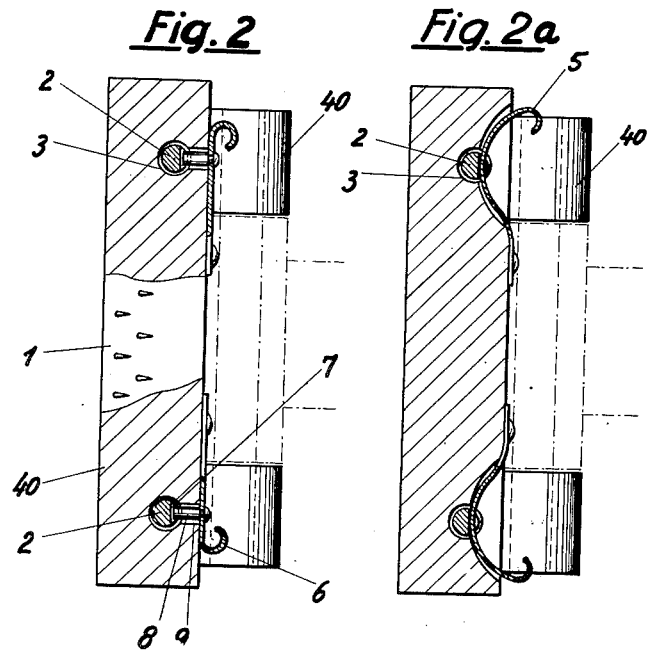
INVENTOR
Gustav Möhring
BY Lowry + Rinehart
ATTORNEYS

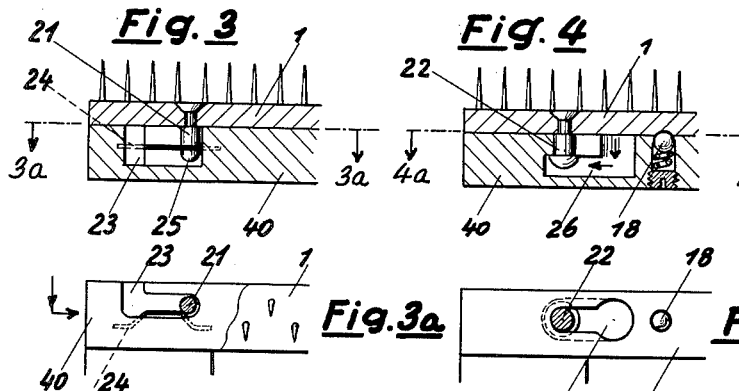
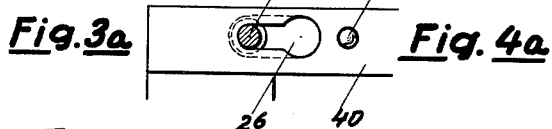
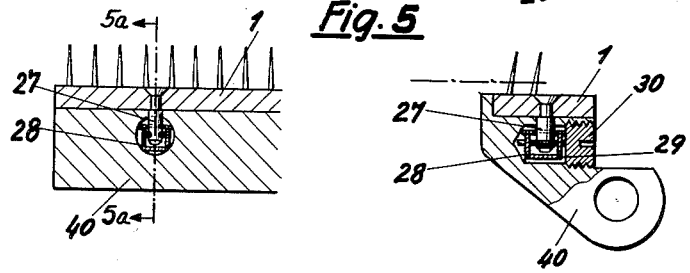
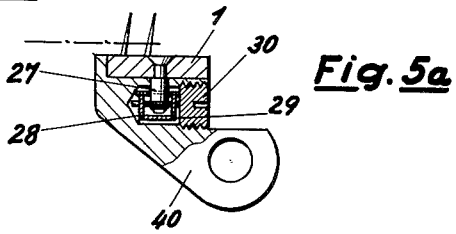

Dec. 4, 1962  G. MÖHRING  3,066,378
MOUNTING MEANS FOR PIN RACKS OF CLOTH STRETCHING
AND DRYING MACHINES
Filed April 21, 1959  3 Sheets-Sheet 3
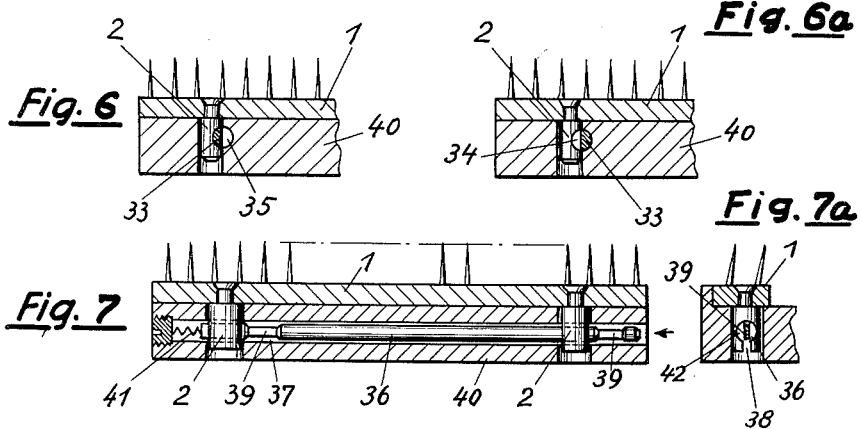
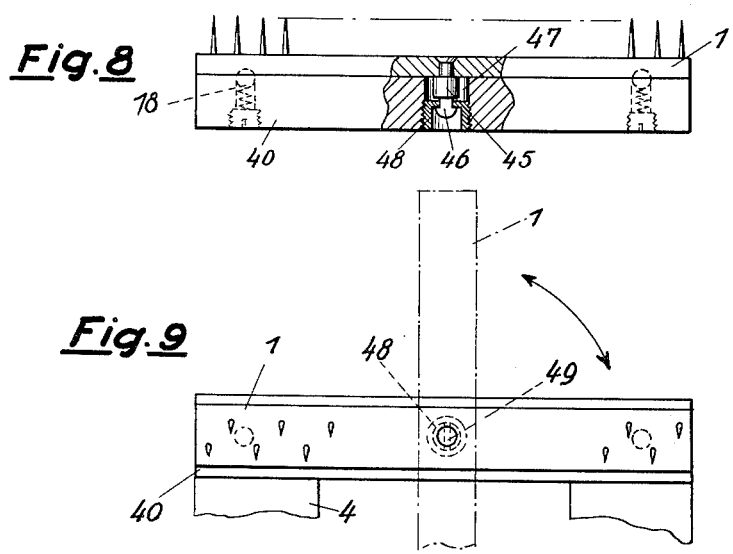
INVENTOR.
Gustav Möhring
BY
Lowry + Rinehart
ATTYS.

United States Patent Office 3,066,378
Patented Dec. 4, 1962

3,066,378
MOUNTING MEANS FOR PIN RACKS OF CLOTH STRETCHING AND DRYING MACHINES
Gustav Möhring, 3 Salzmannweg, Stuttgart-N, Germany
Filed Apr. 21, 1959, Ser. No. 807,862
Claims priority, application Germany Apr. 22, 1958
10 Claims. (Cl. 26—62)

The invention relates to a chain link with a pin rack fitted thereon for stretching and drying machines and similar machines for the treatment of fabric and cloth webs.

It is known to fix pin racks to their respective chain links by screws, that is, by a force-locking connection. This type of fixation, which in itself is simple, is nevertheless open to the objection that the fixing and detachment of the racks takes a relatively long time to perform, as that there are many hundred such chain links in a stretching and drying machine. The above-mentioned objection is the more serious because in many instances it is desired to remove the pin racks from the chain links for the purpose of cleaning such racks better and more thoroughly.

The object of the invention is to overcome this objection and to provide a means for fixing the pin rack so that it can be fitted on a pin rack carrier and also removed therefrom by a few manipulations in a very short time and if possible without the use of tools.

With this object in view it is proposed according to the invention to connect the pin rack with the rack carrier preferably by a locking arrangement of a kind, without using screws or the like, so that it can be easily removed by hand. Latches, notches, locking springs or the like can, for example, constitute such locking elements. Their object is to prevent the pin racks from working loose when running idle or when subject to shaking motions.

The novel means for fixing the pin rack enables the time required for cleaning to be considerably reduced, which is of great importance particularly when working with strongly adhesive dressings and synthetic resin solutions. Several preferred embodiments of the invention are illustrated by way of example in the accompanying drawings, in which:

FIG. 1 is a vertical sectional view of a chain link and pin rack assembly using plug-in studs, FIG. 2 is a horizontal sectional view taken on line 2—2 of FIG. 1, FIG. 2a is a horizontal sectional view, similar to FIG. 2, showing a modified form of locking spring for the plug-in studs, FIG. 3 is a fragmentary longitudinal sectional view of another form of chain link and pin rack with a bayonet slot connection for the plug-in studs, FIG. 3a is a sectional view taken on line 3a—3a of FIG. 3, FIG. 4 is a fragmentary longitudinal sectional view showing a key slot mounting for the plug-in studs and tensioned ball catches for the pin rack, FIG. 4a is a sectional view taken on line 4a—4a of FIG. 4, FIG. 5 is a fragmentary longitudinal sectional view of another form of chain link and pin rack assembly showing a snap-button connection between the chain link and pin rack, FIG. 5a is a cross-sectional view taken on line 5a—5a of FIG. 5, FIG. 6 is a further modification of the retainer for the plug-in stud in the form of a turning-pin locking device associated with the stud, FIG. 6a is a detail sectional view of the device of FIG. 6 with the turning-pin released from engagement with the plug-in stud, FIG. 7 is a further modification of the invention showing a slide-pin locking device associated with the plug-in studs, FIG. 7a is a cross-sectional view of the form of invention shown in FIG. 7, and FIGS. 8 and 9 show respectively a side elevational view partly in section and a top plan view of another form of mounting for the plug-in pin rack involving a swivel plug-in pin rack and ball catches thereof.

In the form of construction illustrated in FIGS. 1, 2 and 2a, a pin rack 1 is provided with two, preferably cylindrical studs 2 tapering at their lower end and which are preferably riveted to the rack. The studs 2 of the pin rack 1 are plugged into correspondingly arranged bores 3 in a rack carrier 40 mounted on and forming part of a chain link 4 shown by dotted lines. To secure the rack against displacement, each stud may cooperate with a spring 5 (FIG. 2a) or 6 (FIG. 2) fixed on the chain link. Each spring 5 engages directly in a recess 7 formed in the stud 2, while each spring 6 is provided with a locking pin 8 as shown in FIGS. 1 and 2 which projects through a bore 9 in the carrier 40 into the recess 7. In order to fix the pin rack it need only be plugged into the chain link with the conical end portions of the studs 2 automatically pressing the resilient locking means outwardly. To remove the rack it is only necessary to pull the two springs outwardly, for which purpose eyes or the like are provided on the springs, so that they are easily disengaged from the studs 2 and the rack can then be detached from the carrier 40.

FIGS. 3, 3a, 4 and 4a show bayonet-type connections. In the example illustrated in FIGS. 3, 3a, two angular notches 23 are formed in the rack carrier 40, in which notches, pins or studs 21 of the pin rack 1 engage in bayonet-joint fashion. A spring 24 projects into each angular notch 23 and engages in an annular groove 25 in each pin 21 to secure the rack in position.

FIGS. 4 and 4a illustrate a modification in which the pin rack 1 is provided with headed studs 22 each cooperating with a slot 26 in the rack carrier 40. Each slot 26 has a narrow portion adapted in width to the thickness of the stud shank, and an enlarged end portion through which the head of the stud 22 may be passed. To fix the rack 1 on the carrier 40, the studs 22 are inserted with their headed ends passing through the enlarged portions of the slots 26 and the rack is then shifted lengthwise so that the shanks of the studs slide in the narrow portions of the slots 26 until they engage the slot ends. In this position the rack 1 is reliably held by one or more ball catches 18 provided in the carrier 40.

FIGS. 5 and 5a show a pin rack 1 with plug-in pins 27 and snap-button locking means. In this case two or more snap-button members 28 provided in known manner with locking springs are fitted in the rack carrier 40 and the forward ends of the plug-in pins 27 are swaged so that they form heads which engage in the snap-button members 28. In the present example the snap-button members 28 are inserted through lateral blind holes 29 which are closed by screws 30.

Another type of locking device for racks with plug-in studs is illustrated in FIGS. 6 and 6a. This locking device consists of a pin 33 mounted so that it can turn in the rack carrier 40, which pin is so arranged that it engages in corresponding notches or transverse grooves 34 provided in the plug-in studs 2. This pin 33 has a flat portion 35 at the point where it is in engagement with the stud 2. Consequently, when the locking pin 33 is turned so that the flat portion 35 is facing the plug-in stud 2, the latter is released so that the pin rack 1 can be removed.

The arrangement illustrated in FIGS. 7 and 7a uses a locking pin 36 which is slidable instead of turnable. To this end, the rack carrier 40 and the two plug-in studs 2 are provided with registering bores 37 and 42 through which the pin 36 is passed which locks the studs 2 and consequently the pin rack 1. The ends of the plug-in studs 2 are provided with slots 38 extending up to the bore 42 and the pin 36 has two flat portions 39 on each side which reduce the thickness of the pin 36 to the width of the slots 38. If the pin 36 is pushed against the resistance offered by a spring 41 in the bore 37 until the flat portions 39 come to lie within the studs 2, the studs are released and consequently the pin rack 1 is free.

In the form of construction illustrated in FIGS. 8 and 9 a turn lock is provided. The pin rack 1 carries in the middle a plug-in stud 45 with a head 46 flattened on both sides to the thickness of its shank. A socket 48 is screwed from below into a bore 47 in the pin rack carrier 40 for receiving the plug-in stud 45 and this sleeve has an end wall with a slot 49 through which the flattened head 46 can then be passed when the pin rack 1 is turned through an angle of 90° in relation to the rack carrier 40. If the rack 1 is swung back into alignment with the carrier 40 after the head 46 has been inserted, the rack will be locked in position on the carrier. The rack is secured against unintentional turning by one or two ball catches 18 or the like fitted in the rack carrier 40.

It is evident that the invention is not restricted to the embodiments illustrated and described but is subject to many other possible modifications.

I claim:

1. A chain link with an exchangeable pin rack member for stretching and drying machines, comprising a pin rack carrier member on said chain link with the pin rack member being on the pin rack carrier member, one of said members having a holding part and the other of said members having a bore to receive the holding part, said holding part being permanently carried by its associated member and arranged to be inserted by a sliding movement perpendicularly to the general plane of said pin rack member into said bore, and locking means on the member having the bore, said locking means retaining the holding part in the bore.

2. A chain link with an exchangeable pin rack member for stretching and drying machines, comprising a pin rack carrier member on said chain link with the pin rack member being on the pin rack carrier member, one of said members having a holding part and the other of said members having a bore to receive the holding part, said holding part being arranged to be inserted perpendicularly to the general plane of said pin rack member into said bore, and locking means on the member having the bore, said locking means retaining the holding part in the bore, said holding part comprising a plug-in pin, said pin having a recess engaged by said locking means.

3. A chain link as set forth in claim 2, wherein the locking means consists of a spring.

4. A chain link as set forth in claim 2, wherein the locking means is constructed as a resilient locking pin.

5. A chain link as set forth in claim 1, wherein said holding part consists of a plug-in pin provided with a lateral recess, said bore being constructed as a cut in the pin rack carrier member from one edge thereof, said cut extending parallel to the pin rack member and being angularly formed to correspond to a bayonet joint, and said locking means consisting of a spring on the pin rack carrier member for engagement with the lateral recess of the plug-in pin.

6. A chain link as set forth in claim 1, wherein said holding part consists of a plug-in pin having an enlarged head, said bore consisting of a portion broader than the width of the head of the plug-in pin and of a portion laterally adjacent to the broader portion and narrower than the width of the head of the plug-in pin, the broader portion of said bore extending transversely to the narrower portion in the interior of the pin rack carrier member so that the head of the inserted plug-in pin shifted into the narrower portion of said bore is secured against upward movement, and at least one ball catch in the pin rack carrier member for engagement with the pin rack member to prevent lateral displacement.

7. A chain link as set forth in claim 2, wherein said locking means is constructed in the form of a snap-button spring.

8. A chain link as set forth in claim 2, wherein said locking means consists of a longitudinally slidable rod adapted to be shifted into and out of engagement with the recess of the plug-in pin.

9. A chain link as set forth in claim 1, wherein said holding part is constructed in the form of a plug-in pin, the free end of which is enlarged to form a head and flattened on two sides, the bore being narrowed into a slot in the pin rack carrier member to receive the flattened portions of the plug-in pin with the walls of the slot engageable with the head of the plug-in pin to prevent upward axial movement thereof, and ball catches arranged between the pin rack member and the pin rack carrier member to prevent relative turning movements thereof.

10. A chain link as set forth in claim 1, wherein the pin rack member is fitted on the rack carrier member by means of a plug-in pin constituting said holding part secured in position by a locking pin constituting said locking means and being mounted on the rack carrier member and engaging the plug-in pin, said locking pin having a flat portion adapted to be moved to a position to release the plug-in pin for the removal of the pin rack member.

References Cited in the file of this patent

UNITED STATES PATENTS

| 333,261 | Shaw | Dec. 29, 1885 |
| 448,452 | Miller | Mar. 17, 1891 |
| 1,442,633 | Strand | Jan. 16, 1923 |
| 1,896,588 | Laurie | Feb. 7, 1933 |
| 2,649,123 | Gulland | Aug. 18, 1953 |
| 2,760,251 | Kirkpatrick | Aug. 28, 1956 |
| 2,822,601 | Rust | Feb. 11, 1958 |

FOREIGN PATENTS

| 1,028,549 | France | Feb. 25, 1953 |
| 264,000 | Germany | Sept. 15, 1913 |
| 929,357 | Germany | June 23, 1955 |
| 2,036 | Great Britain | of 1896 |